United States Patent [19]
Winter et al.

[11] Patent Number: 5,259,027
[45] Date of Patent: Nov. 2, 1993

[54] DIAL RESTORAL METHOD FOR DIGITAL CIRCUITS

[75] Inventors: Stephen J. Winter, Sunrise; Francis E. Roumillat, IV, Coral Springs, both of Fla.

[73] Assignee: Racal-Datacom, Inc., Sunrise, Fla.

[21] Appl. No.: 772,509

[22] Filed: Oct. 7, 1991

[51] Int. Cl.$^5$ .................... H04M 7/00; H04M 3/00; H04J 1/16; H04J 3/14

[52] U.S. Cl. ..................... 379/221; 370/16; 379/237; 379/279

[58] Field of Search ............... 379/220, 221, 229, 236, 379/237, 279; 370/16

[56] References Cited

U.S. PATENT DOCUMENTS 4,119,815 10/1978 Frankfort et al. ............. 379/221 X

FOREIGN PATENT DOCUMENTS 0178796 9/1985 Japan ................................ 379/221

*Primary Examiner*—James L. Dwyer
*Assistant Examiner*—Harry S. Hong
*Attorney, Agent, or Firm*—William A. Newton; Jerry A. Miller

[57] ABSTRACT

A switched digital circuit is used to restore a failed dedicated digital circuit to a remote station in conjunction with reconfiguration of the network's multipoint junction units (MJU). A circuit is established over the public switched digital network from the customer's central location to a remote station requiring restoral. The remote station is then connected back to the dedicated multipoint circuit, at the telephone company central office facilities, by way of digital cross connects and MJUs that perform the digital bridging. The switched digital access line, from the customer central location to the telephone company facilities is then available for use in establishing switched connections to the other remote stations. The process is sequentially repeated for each dedicated digital circuit to a remote station to be restored, thus conserving hardware required at the customer premises and minimizing the number of dial up switched digital access lines needed at the customers central location.

15 Claims, 5 Drawing Sheets

DIAL RESTORAL METHOD FOR DIGITAL CIRCUITS

BACKGROUND

1. Field of the Invention

This invention relates generally to the field of restoral of dedicated data communications links using Public Switched Digital Service (PSDS) facilities. More particularly, this invention relates to a method of achieving such dial restoral which utilizes telephone company central office facilities for digital bridging and requires minimal equipment and dedicated lines at a customer's premise.

2. Background of the Invention

Large data communication networks using digital telephone lines are commonly used to transfer information in government and many industries such as banking and airlines. Most commonly, the main circuits of such networks are dedicated circuits which are owned or leased by the customer from the telephone companies. When failures of access devices (modems, digital service units, etc.) or telephone circuits occur, such networks generally require backup to assure a continuous flow of information.

When such circuits are largely made up of modems or other relatively low speed access devices, backup is commonly done by dial-up circuits which replace the affected circuits end-to-end. Even with low speed circuits, dial up modem speeds are often too slow to adequately back up and restore the network at full speed. With digital circuits, the use of dial backup presents even greater problems due to the great discrepancy in throughput of information between the normal digital circuits and analog dial circuits.

When digital multipoint or digital multiport multipoint circuits (as disclosed in U.S. patent application Ser. No. 07/513,392, filed Apr. 20, 1990 to Basnuevo et al, issued as U.S. Pat. No. 5,177,739, which is incorporated herein by reference) require back up, the complexity grows even further. In order to adequately perform such backup functions with known technology, digital bridging is required along with multiple backup access devices and switching devices, all of which are generally purchased or leased by the customer and must be maintained at the customer's property. The complexity and expense required for such a scheme is often prohibitive.

The present invention provides a method for backing up digital circuits using Public Switched Digital Services (PSDS) which requires minimal additional hardware at the customer's location and utilizes central office digital bridging to provide full speed backup to digital networks.

SUMMARY OF THE INVENTION

It is an object of the present invention to provide an improved dial restoral system especially suitable for high speed multipoint digital circuits.

It is a feature that the present invention is able to provide full speed backup to digital multipoint multiport circuits.

It is an advantage that the present invention that minimal hardware is required at the customer's central location.

It is another advantage that minimal PSDS lines required at customer location.

These and other objects, advantages and features of the invention will become apparent to those skilled in the art upon consideration of the following description of the invention.

A switched digital circuit is used to restore a failed dedicated digital circuit to a remote station in conjunction with reconfiguration of the network's multipoint junction units (MJU). A circuit is established over the public switched digital network from the customer's central location to a remote station requiring restoral. The remote station is then connected back to the dedicated multipoint circuit, at the telephone company central office facilities, by way of digital cross connects and MJUs that perform the digital bridging. The switched digital access line, from the customer central location to the telephone company facilities is then available for use in establishing switched connections to the other remote stations. The process is sequentially repeated for each dedicated digital circuit to a remote station to be restored, thus conserving hardware required at the customer premises and minimizing the number of dial up switched digital access lines needed at the customers central location.

A method for dial restoral of a dedicated digital data circuit in a dedicated digital network includes the steps of: providing a central access device and a central switched access device at a central location; providing a remote access device and a remote switched access device at a remote location; the dedicated digital data circuit connecting the central access device with the remote access device; connecting the central switched access device to a switched digital network access line via a connection within the dedicated digital network; placing a call from the central switched access device through the dedicated digital network to establish a circuit switched connection through the switched digital network to the remote switched access device; within the dedicated digital network, disconnecting the central switched access device from the circuit switched connection at a network point while preventing the point from going to an on hook state; and within the dedicated digital network, connecting the dedicated digital data circuit to the circuit switched connection at the network point.

A method for dial restoral of a dedicated digital data circuit in a dedicated digital network includes the steps of: providing a central digital service unit (DSU) and a central switched DSU at a central location; providing a remote DSU and a remote switched DSU at a remote location; the dedicated digital data circuit being between the central DSU and the remote DSU(s); connecting the central switched DSU to a switched digital network access line via a connection within the dedicated digital network; placing a call from the central switched DSU through the dedicated digital network to establish a circuit switched connection through the switched digital network to the remote switched DSU; within the dedicated digital network, disconnecting the central switched DSU from the circuit switched connection at a network point while preventing the point from going to an on hook state; and within the dedicated digital network, connecting the dedicated digital data circuit to the circuit switched connection at the network point.

A method for dial restoral of a multipoint dedicated digital data circuit in a DDS dedicated digital network, includes the steps of: providing a multiport central digital service unit (DSU) and a multiport central switched DSU at a central location; providing a multiport remote DSU and a multiport remote switched DSU at a remote location; the multipoint dedicated digital data circuit being between the central DSU and the remote DSU; reconfiguring a multipoint junction unit (MJU) within the dedicated digital network to make tributary ports available to the dedicated digital data circuit; connecting the central switched DSU to a switched digital network access line via a connection within the dedicated digital network; placing a call from the central switched DSU through the dedicated digital network to establish a circuit switched connection through the switched digital network to the remote switched DSU; within the dedicated digital network, disconnecting the central switched DSU from the circuit switched connection at a network point while preventing the point from going to an on hook state; and within the dedicated digital network, connecting the multipoint dedicated digital data circuit to the circuit switched connection at the network point; and repeating all steps to restore a second dedicated digital data circuit within the DDS dedicated digital data network.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

Figure 1:
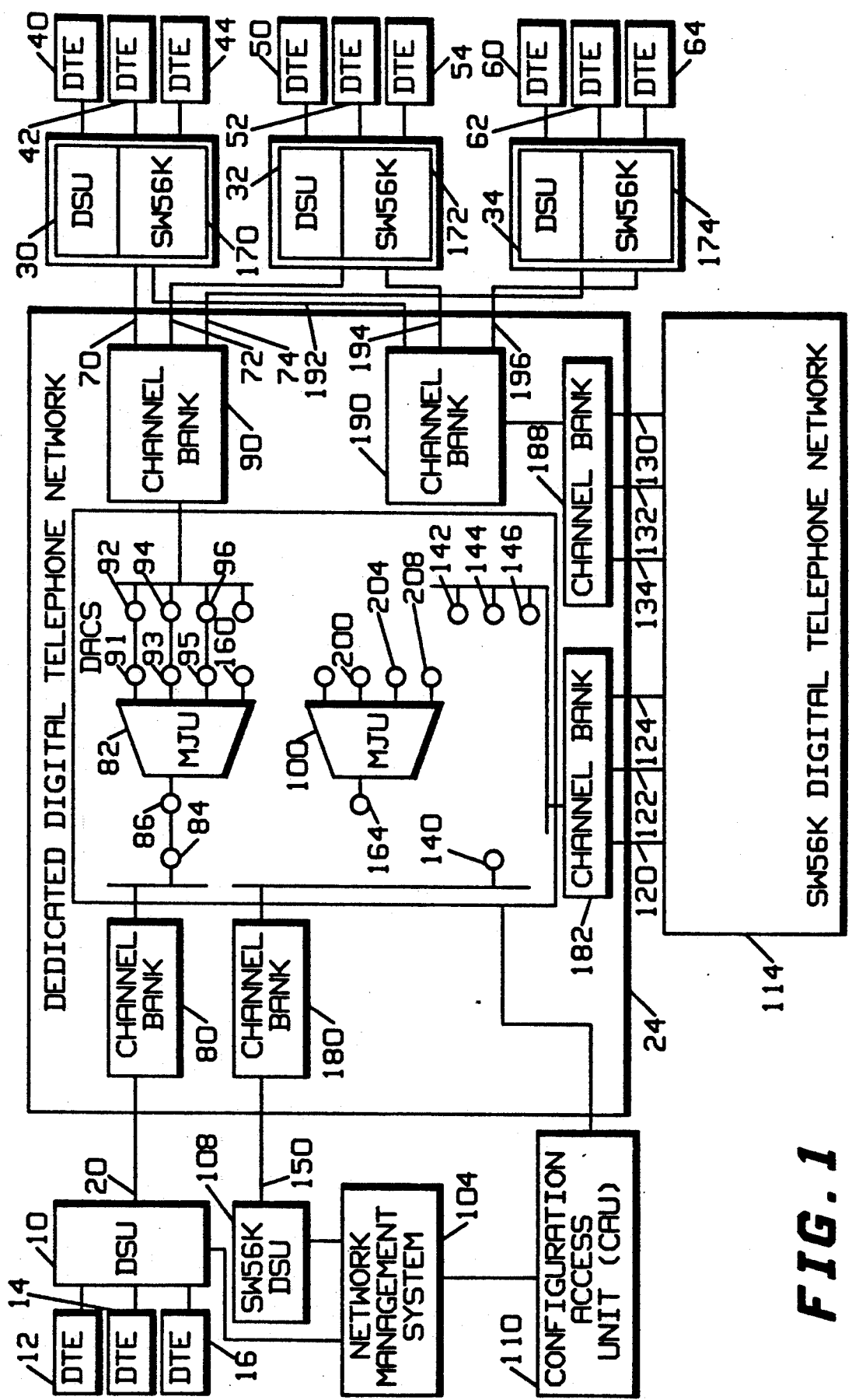
FIG. 1 is a block diagram of an example network to be restored using the present method showing the normal data paths through leased facilities.

Turning now to FIG. 1, an example network is illustrated. This network is a three drop DDS (Digital Data Service) network using three port multipoint multiport DSUs (Digital Service Units) such as those described in the above incorporated document. At a central location, a central dedicated digital network access device such as DSU 10 services three applications represented by DTE (Data Terminal Equipment) 12, 14 and 16 respectively. DSU 10 is connected by a leased line connection 20 to a dedicated digital telephone network 24.

Three remote location digital access devices such as DSUs 30, 32 and 34 are tied to the central DSU 10 through DDS network 24 as described in the above incorporated document. DSU 30 services three DTEs 40, 42 and 44 while DSU 32 services DTEs 50, 52 and 54 and DTE 34 services DTEs 60, 62 and 64. DSU 30 is connected to the dedicated digital network 24 by a leased DDS line 70. DSUs 32 and 24 are similarly coupled to the network 24 via leased DDS lines 72 and 74.

Within the network 24 many possible circuit configurations are possible. The configuration shown in FIG. 1 is a minimal configuration which those skilled in the art will appreciated may be geographically distributed and may be simplified over the actual circuit configuration. Dedicated line 20 is coupled to a channel bank 80 at the local office. The channel bank 80 connects to the control port of a Multipoint Junction Unit (MJU) 82 through DS0 cross connect points 84 and 86. Three tributary ports of MJU 82 are in turn coupled to channel bank 90 via three connections, one for each remote DSU 30, 32 and 34. These three connections are via DS0 cross connect point pairs 91 and 92, 93 and 94, and 95 and 96 respectively.

A network as described above permits multiport multipoint digital communication as described in the above incorporated document. DSUs which support such communications are currently commercially available from Racal Datacom, Inc., 1601 N. Harrison Pkwy., Sunrise, Fla. 33323 (the assignee of the present invention) as the Excalibur ™ Multipoint Multiport-DAP.

In order to implement the restoral system of the present invention, the user of the network may require one or more spare MJUs, such as MJU 100 of FIG. 1, to be available as well as several other telephone company facilities. At the central site, the network normally has a network management and diagnostics system 104 available which performs known management and diagnostics functions. Also needed at the central site is a switched digital access device such as switched 56K DSU 108 and a configuration access unit 110. The term configuration access unit (CAU) is used herein to mean a device used to access the telephone company's customer control and management system. An example of such a system is CNR (Customer Network Reconfiguration) offered by Pacific Bell and equivalent offerings from other telephone companies.

In the present invention, the dedicated circuits shown in FIG. 1 will be backed up by switched circuits such as switched 56K services provided in a switched 56K digital telephone network 114. In order to utilize this method, the user should secure as many dedicated circuits such as lines 120, 122, 124, 130, 132 and 134 as required. Also needed are the dedicated cross connect points 140, 142, 144 and 146. The switched 56K DSU 108 also requires a dedicated line 150. At each remote location, a switched 56K DSU (150, 152 and 154 respectively) is provided. As shown, the switched 56K DSU is provided as a part of the same unit housing DSUs 30, 32 and 34 respectively. Typically access to the switched 56k digital telephone network is facilitated by dedicated digital access circuits from the customer premise to this switched network.

There are many possible scenarios for restoral of the network of FIG. 1 (and other networks) depending upon what type of failure occurs in the network and the configuration of the network. The basic assumption for the present restoral method is that the failure occurs somewhere to the right of points 92, 94 and 96. The failure may involve one or more of lines 70, 72 and 74. The restoral may therefore be either partial, involving one or more remote circuits, or full involving all circuits. The present example assumes that all circuits are to be restored. Upon consideration of this example, it will be clear to those skilled in the art that variations of the method for restoring only a part of a circuit are possible without departing from the present invention.

Figure 2:
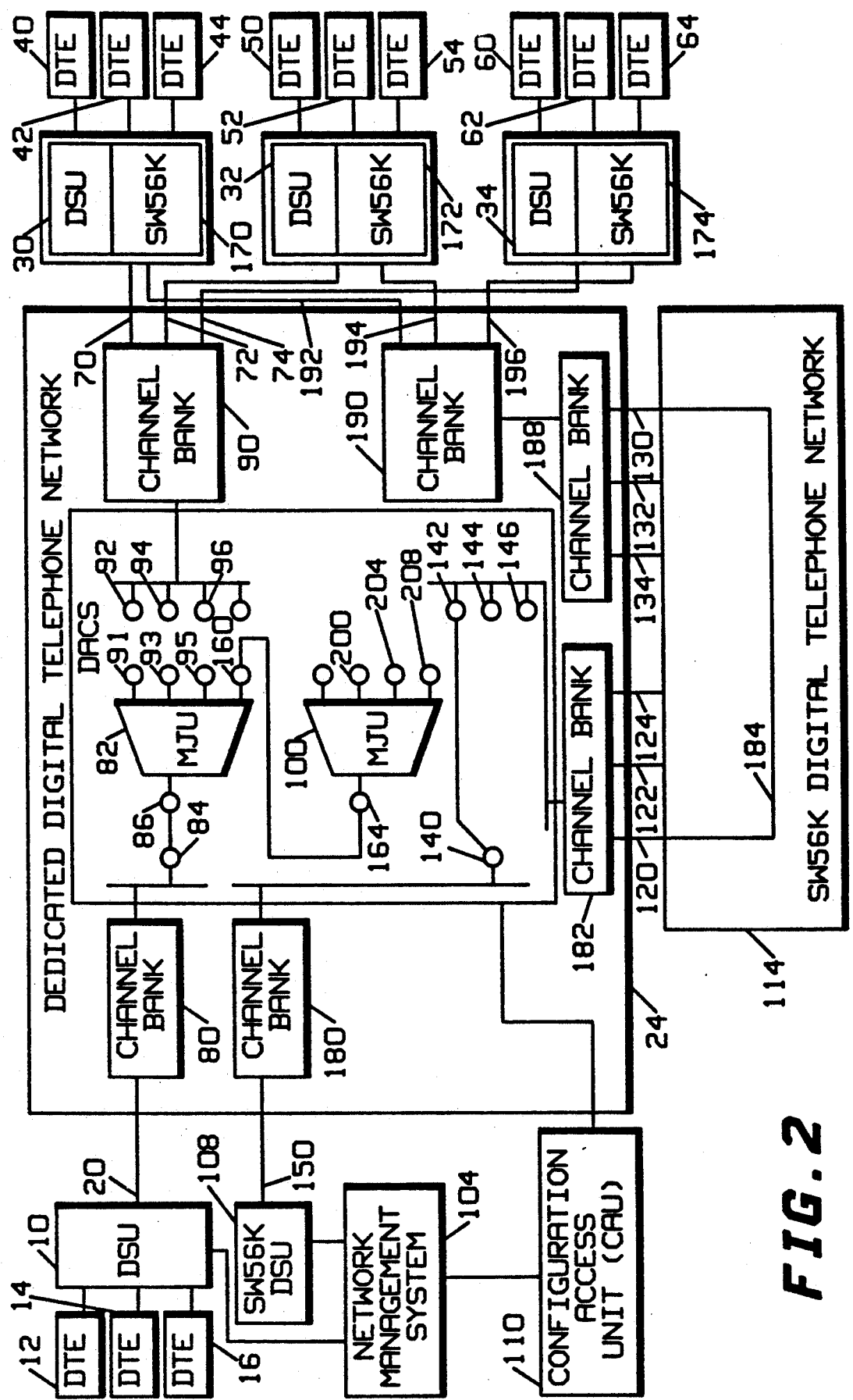
FIG. 2 shows the network of FIG. 1 in a first stage of dial restoral in which a switched 56K connection is being established.

Referring now to FIG. 2, a first stage of the restoral process is shown. It will be noted that the three previous connections from MJU 82 to the cross connect points to the right are now missing, but this is only done to illustrate that the circuit has failed. The connections may be maintained to monitor the status of repair of the network or for other reasons if desired.

The present example illustrates a full restoral of all circuits using the present invention.

Upon detection of a failure by the network management system 104, the network management system 104 instructs configuration access unit 110 to reconfigure the network's MJU's (if necessary for the configuration being restored) to provide enough tributary ports to complete a restoral. In this case, MJU 100 is cascaded with MJU 82 by connecting cross connect points 160 and 164. Other possible configurations are possible (e.g. connecting points 84 and 164 or simply disconnecting points 91, 93 and 95). The present reconfiguration is chosen to keep points 91, 93 and 95 free to again handle data when the failure is repaired while always retaining one free port on the MJU.

Next, the network management system 104 instructs CAU 110 to establish a connection between cross connect points 140 and 142. This provides the switched 56K DSU 108 (or other appropriate switched digital network access device) to establish a circuit switched connection in the switched network 114.

After this connection is made, the switched 56K DSU 108 is instructed by the network management system 104 to place a call to a switched 56K DSU 170 which, as illustrated, is included within the same housing as DSU 30. Similarly, DSU 32 and DSU 34 are packaged with switched 56K DSUs 172 and 174 respectively. In this arrangement, data from the DTEs may be selectively routed through either the dedicated line DSU or the switched 56K DSU under control of the network management system 104. This is not to be limiting, however, since the respective DSUs may be separately packaged and used in conjunction with a switch under network management system control to route data to and from the respective DTEs.

The call establishment information from switched 56K DSU 108 follows line 150 to a channel bank 180 then from cross connect point 140 to cross connect point 142. From there, the path continues to a channel bank 182 to line 120 into the switched 56K digital telephone network 114. Inside network 114, the call causes the switched connection path 184 to be set up from line 120 to line 130 (both of which are leased by the customer). Line 130 has a path back into the dedicated digital network 24 to a channel bank 188. Channel bank 188 is tied to channel bank 190 which is coupled to switched 56K DSU 170 via line 192. When this connection is completed, the next step in the process begins as illustrated in FIG. 3.

Figure 3:
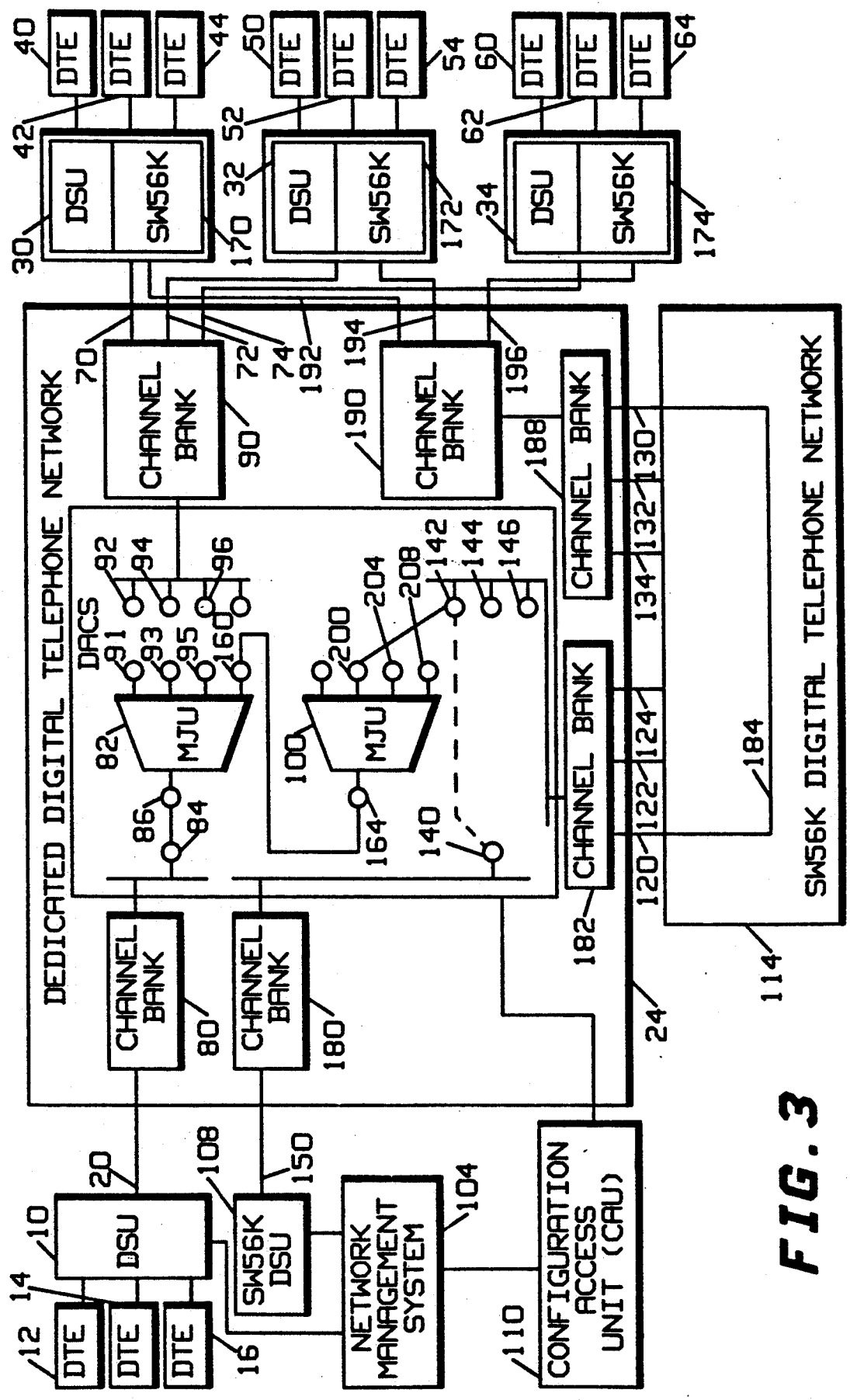
FIG. 3 shows the network of FIG. 1 with a first link restored using switched 56K facilities.

Referring now to FIG. 3, the next task to be accomplished is to route the data path from MJU 100 to the switched 56K digital telephone network 114. This is accomplished by connecting one of the MJU cross connect points 200 to the cross connect point 142 which was used to establish the path from switched 56K DSU 108 to switched 56K DSU 170. Since this point is currently coupled to point 140, this connection must be broken first, as indicated by the broken line. If not done properly, this could result in the circuit going on hook and disconnecting the switched connection 184.

There are several ways around this problem. The technique used in the preferred embodiment is to issue a command from the network management system 104 to the configuration access unit 110 causing the configuration access unit to change the default disconnect signaling state of the cross connect point 142. The signalling state is either on hook or off hook as defined for switched 56k networks. A default signaling state for a cross connect point is the signaling state that will be placed on the cross connect point when it is disconnected from any destination. Normally, if a connection is removed from a cross connect point, the point defaults to on hook status. However, this can normally be changed to off hook status. In this case the connection is not torn down if a connection is broken by keeping an off hook signal at that point. Once this default condition is changed, the connection from 140 to 142 can be broken. At this point the off hook signaling state is present on cross connect point 142 which is connected to line 120, this sends the off hook signaling state to the switched 56k network for switched connection 184. This insures that the switched 56k network will not observe an on hook signaling state and disconnect 184. An alternative mechanism for maintaining the off hook status at the cross connect point 142, is to issue a loopback test command to the cross connect point 142 looping the circuit back toward the switched 56K network. The configuration access unit 110 is then instructed by the network management system to make connection between points 200 and 142.

Once this connection is made, the connection between DSU 10 and switched 56K DSU 170 is complete and the default signalling state can be changed back to on hook. At this point, the circuit should be tested, frame alignment can be performed and any other initialization operations can be carried out. When the DSUs are ready, customer data can be enabled to restore the data traffic to the first remote location.

Figure 4:
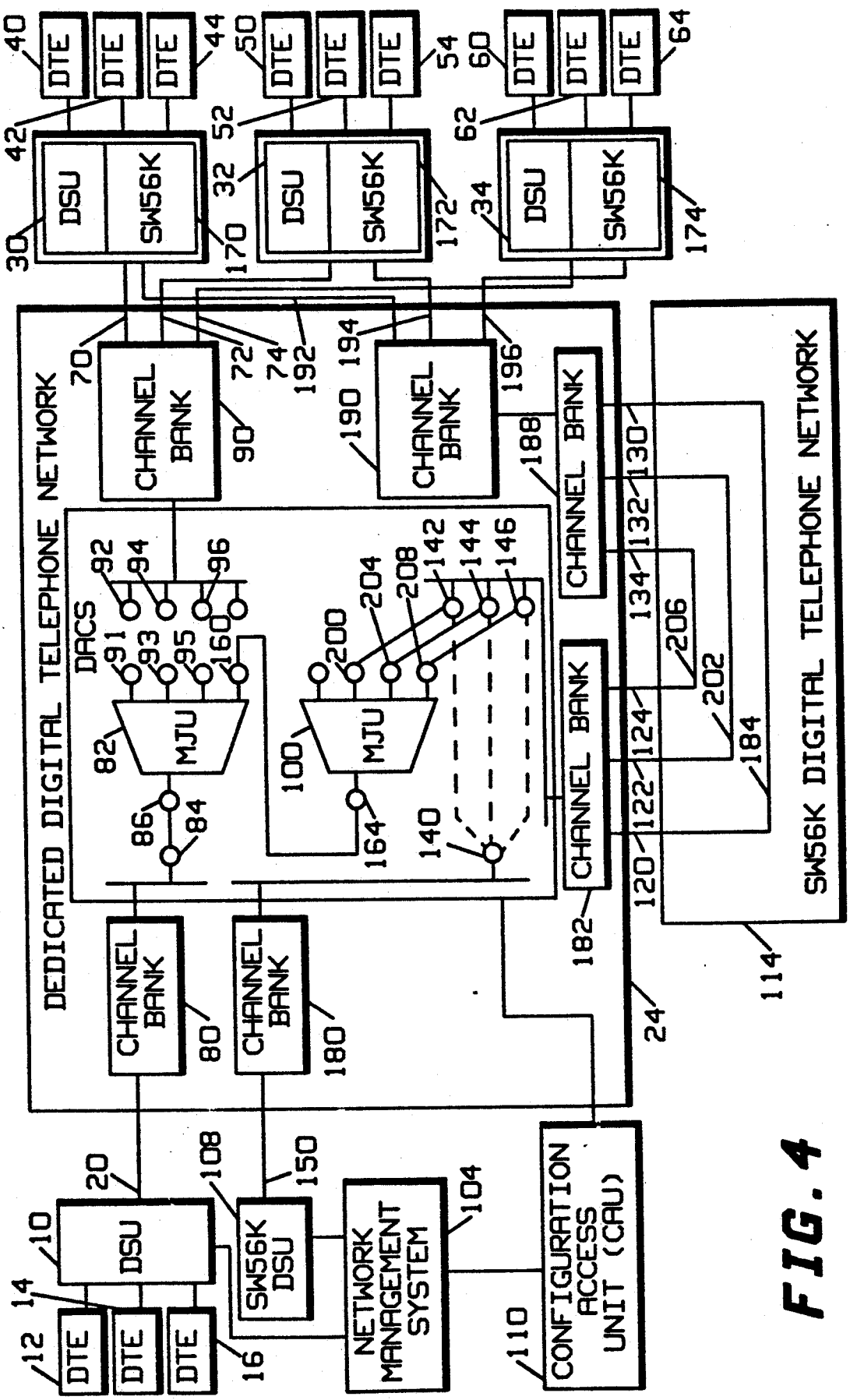
FIG. 4 shows the network of FIG. 1 with all three circuits fully restored.

By essentially repeating this process for all remote locations, the network can be fully restored as shown in FIG. 4. To restore DSU 32 using switched 56K DSU 172, a call is placed through points 140 and 144 to establish dial up connection 202 in the switched 56K digital telephone network 114. Then MJU 100 is routed to point 144 by connecting point 204 to point 144. Similarly, DSU 34 is restored using switched 56K DSU 174 by placing a call through points 140 and 146 to establish dial up connection 206 in the switched 56K digital telephone network 114. Then point 146 is connected to point 208 to complete the restoral.

As shown, a single switched 56K DSU 108 (which does not require a DTE) is repeatedly used to restore a plurality of remote locations. For simple networks as shown, a single switched 56K DSU is adequate. However, for larger networks, it may be advisable to provide several such switched 56K DSUs with each being assigned a portion of the network to perform the restoral upon. In this manner, some parallelism can be obtained in performing the restoral, thereby reducing the time required to obtain complete restoral. Depending upon the network configuration, a pool of MJUs should be available to enable reconfiguration of the network as required. Also, as shown, all three of the circuits were restored. But, it is possible to restore only one or several of the circuits as required using the same process.

Figure 5:
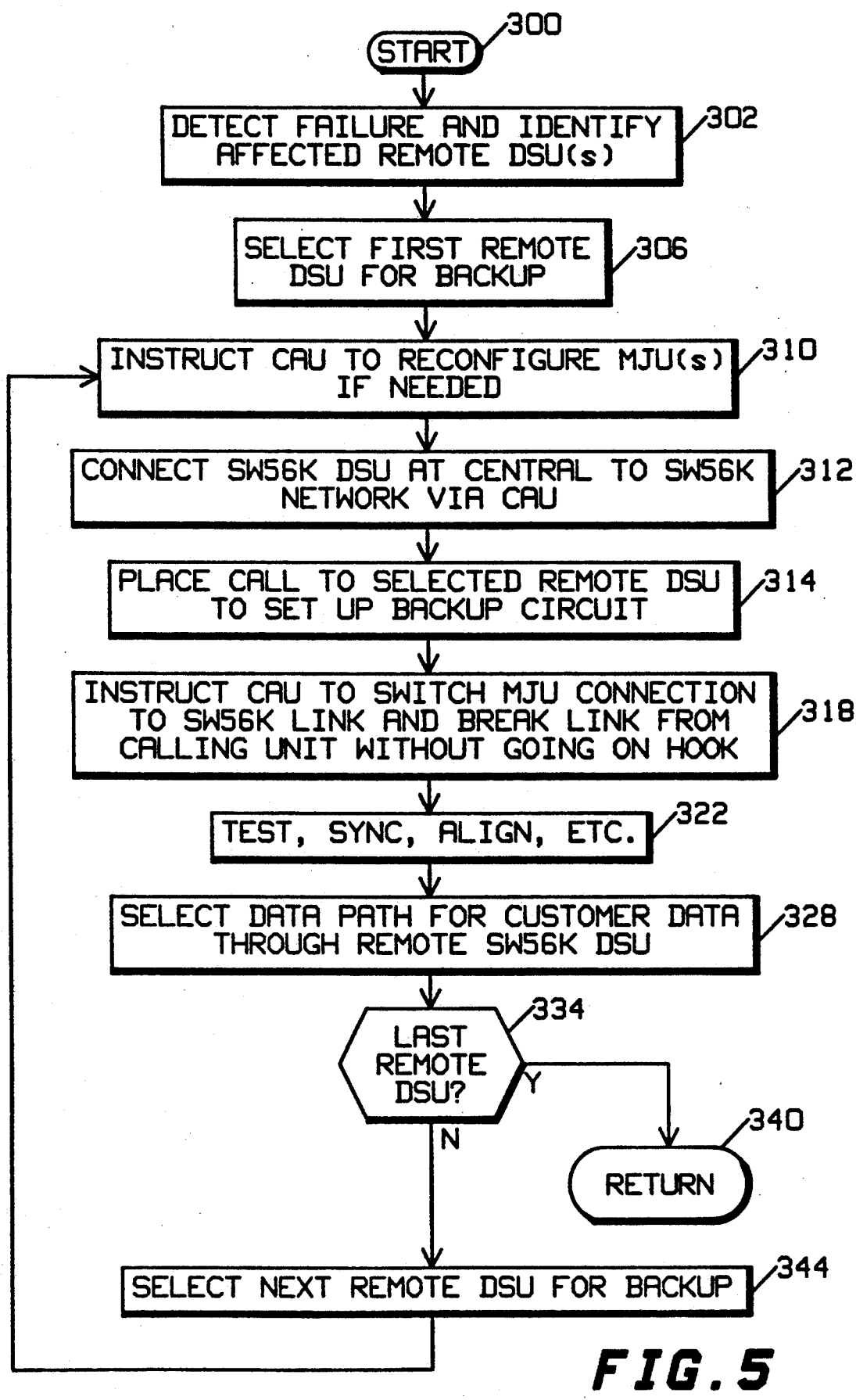
FIG. 5 is a flow chart of the basic restoral process.

Referring now to FIG. 5, a flow chart depicts a summary of the process described above starting at 300. First, a failure is detected at one or more remote DSUs which are identified at step 302. One of the remote DSUs is selected for backup at step 306. The configuration access unit is then instructed by the network management system to reconfigure the MJUs if necessary at step 310. In some instances this may not be necessary. For example, if a multipoint circuit with 2 drops is being restored and two MJU connections are available without reconfiguration, no reconfiguration is required.

At step 312, the switched 56K DSU 108 at the central location is connected to the switched 56K digital telephone network. This is done, once again, by having the network management system 104 instruct the CAU 110 to connect cross connect points 140 and 142 (or 144 or 146, etc.).

A call is now placed from the central switched access device (switched 56K DSU) to a switched access device at the remote location being restored at step 314. This establishes the switched circuit within the switched 56K network which will be used to connect the remote station back into the dedicated circuit at the central. Once this circuit is established, the MJU is connected to the switched circuit from the switched 56K network at step 318, where the link from the calling unit is disconnected without allowing an on hook to be sent to the switched 56K network. At this point a restoral circuit has been established and it can be tested, aligned and otherwise initialized at 322. When this has been accomplished, customer data can be enabled to the switched access device at 328 and the backup for this circuit is complete. If the selected remote is the last to be restored at 334, the routine ends at 340. Otherwise, the next remote access device is selected for restoral at 344 and control returns to 310.

Many variations of the present arrangement are possible without departing from the method of this invention. For example T1 circuits or other types of circuits can be used between the central and remote locations. Other types of switched and dedicated networks than those explicitly called out in the example can be used. The dial network may be an ISDN (Integrated Services Digital Network) dialing in to bridges in a dedicated network. Other variations will occur to those skilled in the art.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method for dial restoral of a dedicated digital data circuit in a dedicated digital network (24) having a digital multipoint circuit, comprising the steps of:
   providing a central access device (10) and a central switched access device (108) at a central location;
   providing a remote access device (30) and a remote switched access device (170) at a remote location;
   said dedicated digital data circuit connecting said central access device (10) with said remote access device (30);
   connecting said central switched access device (108) to a switched digital network access line (120) via a connection (140, 142) within the dedicated digital network;
   placing a call from said central switched access device (108) through said dedicated digital network (24) to establish a circuit switched connection through a switched digital network (114) to said remote switched access device (170);
   within said dedicated digital network (24), disconnecting said central switched access device (108) from said circuit switched connection at a network point (142) while preventing said point (142) from going to an on hook state; and
   within said dedicated digital network (24), connecting said dedicated digital data circuit to said circuit switched connection at said network point (142).

2. The method of claim 1, further comprising the step of reconfiguring a digital bridging device (82) within said dedicated digital network (24) to make tributary ports (200, 204, 208) available to said dedicated digital data circuit.

3. The method of claim 2, wherein said digital bridging device is a first multipoint juntion unit (MJU) (82) and wherein said reconfiguring step includes cascading a second MJU (100) with said first MJU (82).

4. The method of claim 2, wherein said digital bridging device is a first MJU (82) and wherein said reconfiguring step includes connecting said first MJU (82) with one or more other MJUs selected from a pool of available MJUs.

5. The method of claim 1, further comprising the steps of repeating all steps to restore a second dedicated digital data circuit within said dedicated digital data network (24).

6. The method of claim 1, wherein said access devices are multiport access devices.

7. The method of claim 1, wherein said dedicated digital data network is a digital data service (DDS) network and wherein said switched digital network is a switched 56K digital network.

8. A method for dial restoral of a dedicated digital data circuit in a dedicated digital network (24) having a digital multipoint circuit, comprising the steps of:
   providing a central digital service unit (DSU) (10) and a central switched DSU (108) at a central location;
   providing a remote DSU (30) and a remote switched DSU (170) at a remote location;
   said dedicated digital data circuit being between said central DSU (10) and said remote DSU (30);
   connecting said central switched DSU (108) to a switched digital network access line (120) via a connection within the dedicated digital network (140, 142);
   placing a call from said central switched DSU (108) through said dedicated digital network (24) to establish a circuit switched connection through a switched digital network (114) to said remote switched DSU (170);
   within said dedicated digital network (24), disconnecting said central switched DSU (108) from said circuit switched connection at a network point (142) while preventing said point (142) from going to an on hook state; and
   within said dedicated digital network (24), connecting said dedicated digital data circuit to said circuit switched connection at said network point (142).

9. The method of claim 8, further comprising the step of reconfiguring a digital bridging device (82) within said dedicated digital network (24) to make tributary ports (200, 204, 208) available to said dedicated digital data circuit.

10. The method of claim 9, wherein said digital bridging device is a first multipoint junction unit (MJU) (82) and wherein said reconfiguring step includes cascading a second MJU (100) with said first MJU (82).

11. The method of claim 10, wherein said digital bridging device is a first MJU (82) and wherein said reconfiguring step includes connecting said first MJU (82) with one or more other MJUs selected from a pool of available MJUs.

12. The method of claim 8, further comprising the steps of repeating all steps to restore a second dedicated digital data circuit within said dedicated digital data network (24).

13. The method of claim 8, wherein said access devices are multiport access devices.

14. The method of claim 8, wherein said dedicated digital data network is a digital data service (DDS) network and wherein said switched digital network is a switched 56K digital network.

15. A method for dial restoral of a multipoint dedicated digital data circuit in a digital data service (DDS) dedicated digital network (24) having a digital multipoint circuit, comprising the steps of:

providing a multiport central digital service unit (DSU) (10) and a multiport central switched DSU (108) at a central location;

providing a multiport DSU (30) and a multiport remote switched DSU (170) at a remote location; said multipoint dedicated digital data circuit being between said central DSU (10) and said remote DSU (30);

reconfiguring a multipoint junction unit (MJU) (82) within said dedicated digital network (24) to make tributary ports (200, 204, 208) available to said dedicated digital data circuit;

connecting said central switched DSU (108) to a switched digital network access line (120) via a connection within the dedicated digital network (140, 142);

placing a call from said central switched DSU (108) through said dedicated digital network (24) to establish a circuit switched connection through a switched digital network (114) to said remote switched DSU (170);

within said dedicated digital network (24), disconnecting said central switched DSU (108) from said circuit switched connection at a network point (142) while preventing said point (142) from going to an on hook state; and within said dedicated digital network (24), connecting said multipoint dedicated digital data circuit to said circuit switched connection at said network point (142); and repeating all steps to restore a second dedicated digital data circuit within said dedicated digital data network (24).

* * * * *